CLARENCE C. CLARK
GEORGE F. HETZEL
INVENTORS

BY Tom Sherrard, atty.

United States Patent Office 3,515,415
Patented June 2, 1970

3,515,415
INTERSECTED JAMB NUT WITH COLLAR RETAINER
Clarence C. Clark, 1474 Coolidge St., San Diego, Calif. 92111, and George F. Hetzel, 13525 Scotts Way, Poway, Calif. 92064
Filed Sept. 12, 1968, Ser. No. 759,368
Int. Cl. F16l 17/00
U.S. Cl. 285—354                                   1 Claim

ABSTRACT OF THE DISCLOSURE

A resilient nut with an inner circumferential flange; a resilient ring portion integral therewith, all of which are disjoined, and a collar snugly circumscribing the ring portion which retains the disjoined portions as if they were joined.

BACKGROUND OF THE INVENTION

Heretofore, it has been difficult and time consuming to expose an open end of certain pipes and tubes to accept jamb nuts. There is usually one open end which is accessible, but this end has a rim or flange on its outside circumference for retaining the nut. The nut cannot be slipped on the exposed end of the pipe because the inner rim of the nut is not larger than the outer rim of the pipe. The opposite end of the pipe, without the rim, is often inaccessible. It may be covered by plaster or other building structure. It may be difficult to loosen because of corrosion. These conditions often occur in replacement of drain traps associated with common lavatories and the like.

Prior art has grappled with the problem, but a simple, inexpensive, easily understood structure has not, until now, been disclosed.

SUMMARY

Our device permits a jamb nut to couple pipes by manually expanding a split nut whereby it passes over and around the usual rim on the exposed end of a pipe. The nut is made of resilient material whereby it automatically assumes the continuous circular configuration around the pipe upon passing over the rim. A solid ring collar snugly slides over a portion of the nut, insuring retention of the nut configuration during threaded engagement.

BRIEF DESCRIPTION OF THE DRAWING

Referring to the drawing forming a part hereof.

DESCRIPTION OF PREFERRED EMBODIMENTS

Figures 1, 2:
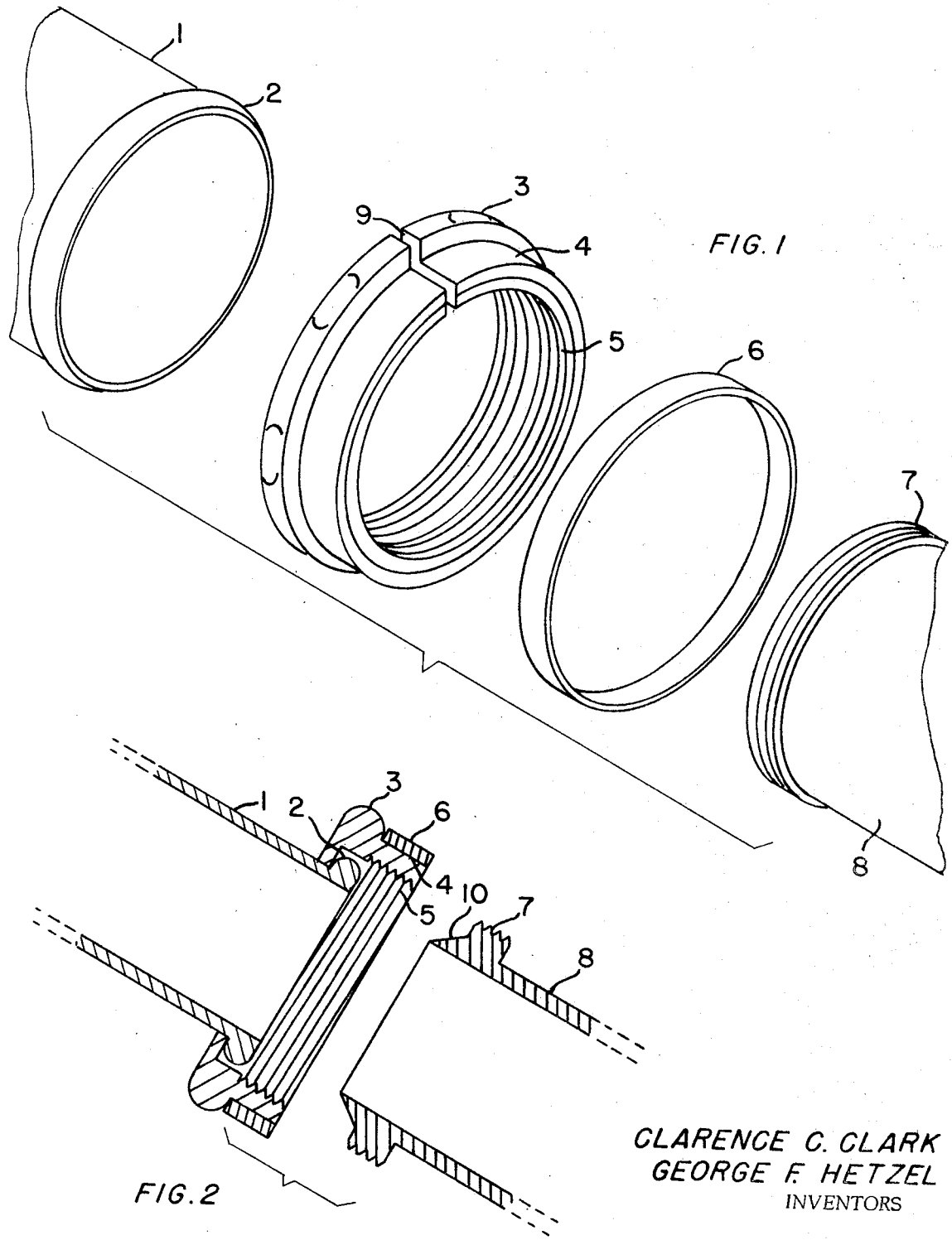
FIG. 1 is an exploded perspective view of the entire assembly including pipes to be joined.
FIG. 2 is a cross sectional side elevation thereof showing the assembly in position for threaded engagement.

In the drawing, wherein like numbers represent like parts throughout, the numeral 1 represents a section of conventional pipe to be joined. Outer circumferential flange or rim 2 is necessary to secure the union of pipes, but it has heretofore been an impediment to slipping on a jamb nut. Usual pipe 8 with conventional threads 7 with bevel 10 complete the ordinary structure to be joined.

Our novel nut body portion 3 has an inner circumferential flange at one edge thereof as illustrated. Near the opposite edge thereof, it has novel ring portion 4 integral therewith. The ring portion is provided with threads 5 on the inner circumference thereof.

A novel feature of the structure are two identical abutting surfaces 9 formed by one intersectional cut across portions 3 and 4. The described portions are formed of resilient material, preferably plastic, which will automatically return to the substantially closed ring position after manual twisting and spreading to circumvent flange 2.

Solid collar 6 completes the parts of the invention. It is a plain band of proper size to snugly fit over ring portion 4 when in use. Ring 4 is preferably made of copper, but it may be made of any suitable substance which will not expand when in use.

As can be seen, surfaces 9 are forced apart as the body portions are slid over rim 2. Thereafter collar 6 slides on ring portion 4 and is held there by friction. Thereafter, threads 7 and 5 are engaged in the usual manner. Collar 6 now holds the nut in a fixed circular configuration.

It is to be understood that one skilled in the art may make obvious changes in our invention which will fall within the scope of the subjoined claim.

What is claimed is:
1. In combination:
  (a) a flexible nut body portion provided with an inner circumferential flange proximate to one edge thereof,
  (b) inner circumferential threads provided in the body portion proximate to the edge opposite that of the flange,
  (c) a ring portion forming the outside surface of the body portion,
  (d) abutting surfaces formed as one intersectional severance through the body and ring portions.
  (e) a retaining means to hold the abutting surfaces in unison as the threads engage the conventional outside threads of waste or drain pipes.

References Cited

UNITED STATES PATENTS

| | | | |
|---|---|---|---|
| 260,968 | 7/1882 | Frey | 285—354 |
| 1,376,296 | 4/1921 | Snow. | |
| 1,706,317 | 3/1929 | Oakes | 85—33 |

DAVID J. WILLIAMOWSKY, Primary Examiner
W. L. SHEDD, Assistant Examiner

U.S. Cl. X.R.
285—387; 85—33